United States Patent [19]

Kersten et al.

[11] 4,139,259
[45] Feb. 13, 1979

[54] LIGHT DISTRIBUTOR FOR OPTICAL COMMUNICATION SYSTEMS

[75] Inventors: Ralf Kersten, Rottach-Egern; Hans-Hermann Witte, Munich, both of Fed. Rep. of Germany

[73] Assignee: Siemens Aktiengesellschaft, Berlin & Munich, Fed. Rep. of Germany

[21] Appl. No.: 756,137

[22] Filed: Jan. 3, 1977

[30] Foreign Application Priority Data

Jan. 12, 1976 [DE] Fed. Rep. of Germany ....... 2600893

[51] Int. Cl.² .................... G02B 5/14; G02F 1/13
[52] U.S. Cl. ................ 350/96.16; 350/96.13; 350/356
[58] Field of Search ........ 350/96 C, 96 WG, 160 LC, 350/160 R

[56] References Cited

U.S. PATENT DOCUMENTS

| | | | |
|---|---|---|---|
| 3,455,625 | 7/1969 | Brumley et al. | 350/96 C |
| 3,455,668 | 7/1969 | Upton | 350/96.15 |
| 3,874,780 | 4/1975 | Love | 350/96 WG |
| 3,980,395 | 9/1976 | Giallorenzi et al. | 350/160 LC |
| 3,980,396 | 9/1976 | Pollock et al. | 350/160 LC |
| 4,008,947 | 2/1977 | Baües et al. | 350/96 C |

*Primary Examiner*—Paul A. Sacher
*Assistant Examiner*—Rolf Hille
*Attorney, Agent, or Firm*—Hill, Gross, Simpson, Van Santen, Steadman, Chiara & Simpson

[57] ABSTRACT

A light distributor which is connected to an incoming light guide and a plurality of outgoing light guides for distributing a light arriving from the incoming light guide into the plurality of outgoing light guides characterized by the distributor comprising a disk member, which may be circular, of a material which has properties of a low absorption and low scattering, and the member has an abutting surface for both the incoming and outgoing light guides with the abutting surface of the incoming light guide being opposite to the abutting surface of the outgoing light guides. The disk member of the light distributor will have a thickness equivalent to the diameter of the cores of the light guides. The disk member may be of a material which is birefringent or which has a controllable index of refraction.

7 Claims, 3 Drawing Figures

LIGHT DISTRIBUTOR FOR OPTICAL COMMUNICATION SYSTEMS

BACKGROUND OF THE INVENTION

The present invention is directed to a light distributor for an optical communication system.

In known branching arrangements, a branching fiber core is arranged within a common sheath. In order to produce the branching fiber core of this type, a preform of the branching core is first cut out of a glass block. Then glass parts for sheathing this core are cut and connected to the preform of the branching core. The blank produced in this fashion is then drawn out to a light guide fiber with several cores.

SUMMARY OF THE INVENTION

The present invention is directed to providing a light distributor which can be produced in an especially simple manner. To accomplish this task, the present invention is directed to a light distributor connected to an incoming light guide and several outgoing light guides for distributing the light arriving from the incoming light guide into the outgoing light guides comprising a disk member of a material having properties of a low light absorption and a low light scattering, said disk member having edge portions forming an abutting surface for each of the incoming and the outgoing light guides, said abutting surfaces of the incoming light guide being opposite the abutting surfaces of the outgoing light guides.

It is an advantage of the light distributor of the present invention that the optical signal which enters into the light distributor from a light guide, such as in the light guiding fiber, is approximately distributed uniformly to several outgoing light guides, which also may be optical fibers. This characteristic is particularly advantageous when used in a distribution network for cable television.

A further advantage of the light distributor of the present invention is that, in spite of the extraordinarily simple construction of the light distributor, a degree of efficiency of 79% can be achieved when fibers with no cladding are used. The degree of efficiency is understood as the ratio of the sum of the light intensity which is coupled into the outgoing light guides to the light intensity which is received from the incoming light guide.

The light distributor of the present invention can be advantageously produced in a printed circuit board manner. For example, it can be produced on a substrate with all processing steps being done from one side only of the substrate.

DESCRIPTION OF THE PREFERRED EMBODIMENT

The principles of the present invention are particularly useful for a light distributor 1 for distributing light between an incoming light guide 2 and a plurality of outgoing light guides 3–7. The light distributor 1 is a thin disk member of a material which has properties of a low scattering and a low light absorption. The thickness of the disk member forming the light distributor 1 is equal to the sum of the diameter of the cores and the thickness of the cladding of the light guides 2–7 which may be optical fibers. If the light guides 2–7 are unsheathed light guides or unsheathed optical fibers, the thickness of the disk member of the light distributor 1 is equal to the diameter of the individual light guides.

Figure 1:
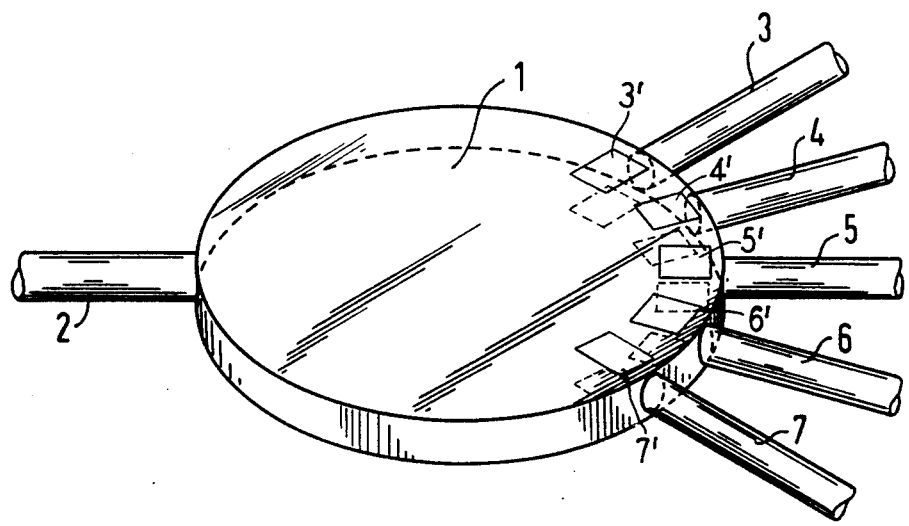
FIG. 1 is a perspective view of a light distributor in accordance with the present invention.

As illustrated in FIG. 1, a light signal which is fed into a light distributor 1 through the incoming light guide 2 is passed through the outgoing light guides 3–7. The abutting surface of the light distributor with each of the light guides lies on a shape, which may be a circle with the abutting surface of incoming light guide being opposite to the abutting surfaces of the outgoing light guides 3–7. To avoid reflection losses, the abutting surfaces, which are edge portions of the disk member, can be emersed in a known fashion.

Because the light distributor 1 is a disk member, the light entering into the distributor through the incoming light guide 2 is spread out only in the direction which is perpendicular to the propagation direction of the light in the disk member and parallel to the parallel surfaces of the disk member. Thus, the light being propagaged through the disk member between the incoming and outgoing light guides is moving in at a direction perpendicular to the direction of spreading. In this connection, the dimension or degree of spreading of the light is dependent on the index of refraction of the light distributor and on the maximum reflected ray angle of the light in the incoming light guide 2. The amount of spreading will determine the width L of the range of the light distributor 1.

Figure 2:
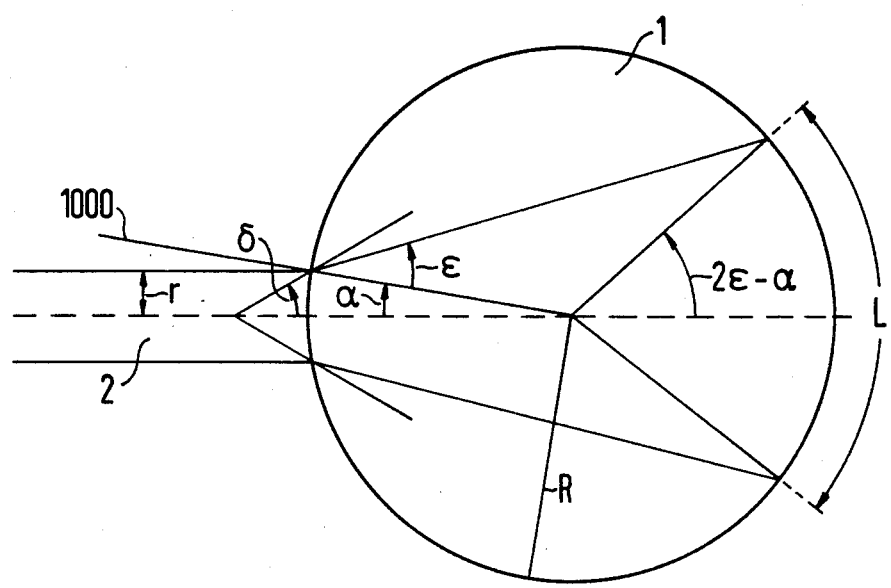
FIG. 2 is a diagrammatic plan view of the distributor which illustrates the various angles used in calculating the light distributor's range which lies opposite to the incoming light guide.

In order to calculate the size of the width L of the range of the light distributor which range lies opposite the incoming light guide 2 and which is illuminated because the spreading of the light in the distributor, FIG. 2 is utilized. The incoming light guide 2 has a radius r. With sheathed light guides, which are light guides that have a core with a high index of refraction and a sheating or cladding with an index of refraction lower than that of the core, r is the radius of the light guide core. The maximum emitted ray angle of the incoming light guide 2 is designated with $\delta$. Thus, the light beam from the incoming light guide opposite an axis of incidence at 1000 enters into the light distributor 1 at a maximum angle of $\delta + \alpha$. In this connection it is approximately correct the $\alpha = r/2 \pi R$ using a circular shape for the disk in this special example. The radius of the light distributor or, respectively, the radius of the circle upon which the abutting surfaces of the light distributor lies is designated with R. It should be noted that all angles mentioned hereinabove and in the following are measured in circular measure by radians and are either multiples or fraction of a complete circle with a circumference $2\pi$. For an angle $\epsilon$, which the incident light beam maximally occupies vis-a-vis the axis of incident 1000 within the light distributor 1, the following was true:

$$\epsilon = \arcsin(\sin(\delta + \alpha/n))$$

wherein n is the index of refraction of the material of the light distributor. Thus, for the dimensions of the width L $$L = 2(2\epsilon - \alpha)R$$

Thus, L which is the dimension or width of the range of the light distributor will indicate the maximum width or arc for the abutting surfaces for the outgoing light guides. If the outgoing light guides have a total diameter (core and cladding) $2r_a$ then the maximum number N of outgoing light guides is given by $$N = L/2r_a = (2\epsilon - \alpha)R/r_a$$

Expediently, the radius R is selected in such a fashion that N is an integer.

In the following, the degree of efficiency of the light distributor is calculated for the case in which N is a whole number and the light distributor for which again a circular shape is selected, has a thickness which is at least as large as the diameter of the light cores of sheated light guides or the diameter of unsheathed light guides. The degree of efficiency of the light distributor is then the ratio of the size of the surface of the light distributor, which is illuminated and is on the side of the outgoing light guides, to either the total cross section of the outgoing light guides if these are not sheathed or to the total cross section of the cores of the outgoing light guides when the light guides are sheathed. In order to obtain the maximum degree of efficiency, the outgoing light guides must lie as closely next to one another as possible at the abutting surface on the circumference of the disk forming the light distributor. With sheathed light guides, it is therefore expedient to remove the sheathing of these light guides in the vicinity of the light distributor so that the light guide cores can be arranged tightly adjacent each other at the abutting surfaces. The thickness of the light distributor must be as small as possible, but it must not be smaller than either the diameter of an incoming unsheathed light guide or the diameter of the core plus the thickness of the cladding of an incoming sheathed light guide. If the thickness of the light distributor is thinner, then the incoming light does enter only partly into the light distributor.

Thus, for the degree of efficiency, the following is valid:

$$\eta = N\pi r_{aK}^2/h \cdot L,$$

if $2r_K \leq h$ and $2r_{aK} \leq h$.

In the above formula, h is the thickness of the light distributor, $r_K$ is either the radius of the core of a sheathed incoming light guide or the radius of an incoming unsheathed light guide; $r_{aK}$ is either the radius of the core of outgoing sheathed light guide or the radius of an outgoing unsheathed light guide.

If $2r_K = h = 2r_{aK}$ and if $L = 2Nr_{aK}$ is true, the results obtained are $$\eta = \pi r_K^2/4r_K^2 = \pi/4 = 79\%$$

If the incoming light guide and outgoing light guides have the same type of construction of the same diameter, this will be the maximum degree of efficiency. With sheathed light guides the degree of efficiency can be only achieved if the sheathing of the light guides is removed in the vicinity of the distributor and the light cores of these light guides abut as tightly adjacent as possible against the light distributor and this is the form of construction of the preferred embodiment.

Figure 3:
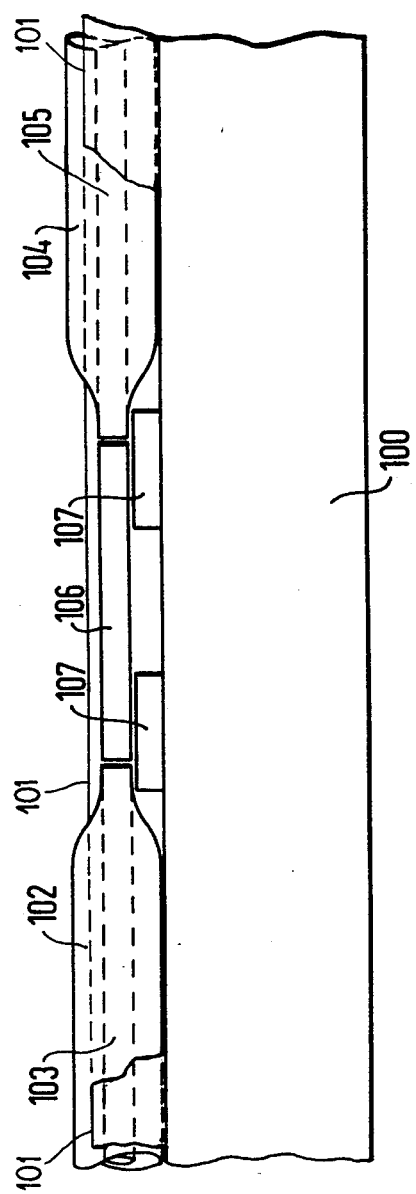
FIG. 3 is a side view with portions broken away for purposes of illustration of a preferred embodiment of the distributor.

The preferred embodiment of the light distributor of the present invention is illustrated in FIG. 3. In this embodiment, a substrate 100, which is, for example glass or other material with a supporting capacity, is provided with a synthetic material film 101. This synthetic material film has guide notches or grooves receiving the light guides and a free space receiving the light distributor.

If the film 101 is a light sensitive synthetic material, these guide grooves and free space in the film 101 can be produced by exposing the film to light utilizing a mask structure which is a duplicate of the light guide grooves and free space. When the film of synthetic material is developed, the regions of the guide grooves and the free space in the synthetic material film are then removed.

As illustrated in FIG. 3, an incoming light guide 102 with a core 103 and an outgoing light guide 104 with a core 105 are shown on opposite sides of a light distributor 106. At the junction point of the light guides 102 and 104 with the light distributor 106, the sheathing of the light guides has been etched away so that only the light guide cores 103 and 105 abut against the light distributor 101. The thickness of the light distributor corresponds to the diameter of the light guide cores 103 and 105. The light distributor is arranged on an intermediate layer 107, which has a thickness corresponding to the thickness of the sheath of the light guides 102 and 104.

The intermediate layer 107 may consist of any desired material, but if at all possible, the index of refraction of the intermediate layer 107 is to be substantially smaller than the index of refraction of the light distributor 106 so that no light from the light distributor can be scattered or diffused into the intermediate layer. The light distributor 106 can, for example, consist of the same material as the light cores and the intermediate layer can consist of the same material as the light guide sheath. As light guides, Corning fibers with a fiber diameter of 140 μm and a core diameter of 90 μm can, for example be used.

The intermediate layer, which is about 20 μm to 25 μm thick in the case of using Corning fibers, can consist of a synthetic material film. So that the light distributor 106 cannot be raised in an undesirable manner by a possible waviness or buckling of the film 107, it can be held onto the intermediate layer 107 by small springs (not illustrated).

The light distributor can also be made of a birefringent or double refracting material, for example $TiO_2$ or $LiNbO_3$. In this way, dependent on the orientation of the birefringent material, a differing influencing of the light being radiated in and through the incoming light guide can be achieved if this light is alternately polarized in various directions.

The light distributor can also be made of a material which has a controllable or regulatable index of refraction. For example, the light distributor can contain liquid crystals, e.g. the liquid-crystal material can be p-methoxy benzylidene-p-n-butylaniline. In this way, not only the intensity but also the degree of polarization of the light in the outgoing light guides can be controlled.

If the light distributor has a locally differing index of refraction, an uneven division of the light intensity will be received by each of the outgoing light guides. For example, the index of refraction of the light distributor can have altered regions which were obtained by ion implantation.

It is also possible to use the light distributor of a material with a controllable index of refraction so that the local index of refraction may be altered in a controllable way and the intensity distribution of the light being received by the outgoing light guides will be altered in response to the altering of the index of refraction. In this embodiment, individually triggerable pairs of electrodes are arranged on the light distributor so that the index of refraction may be altered in the region of the triggerable electrodes because of an electro-optical effect of the distributor disk, which may be fabricated of LiNbO$_3$. An example of such an arrangement is illustrated in FIG. 1 by electrode pairs 3', 4', 5', 6' and 7'.

The light distributor can also consist of an electro-optical material, which may be LiNbO$_3$ or LiTaO$_3$. With the aid of correspondingly formed electrodes, it is then possible by the application of a voltage to the electrodes to focus the light being radiated from the incoming light guide through the distributor onto the end surfaces of the outgoing light guides. In this way, at least theoretically, a degree of efficiency of 100% can be achieved.

If the light distributor has a circular shape and consists of a material with an index of refraction of $n = 2$, the light beams then leave the light distributor axially parallel to the longitudinal axis of the incoming light guide. A focusing of the light onto the outgoing light guides can then take place by using a plurality of similar lenses that are located between the outgoing light guides and the light distributor. In this way, a degree of efficiency which is more than 79% can be achieved.

Although minor modifications may be suggested by those versed in the art, it should be understood that we wish to employ within the scope of the patent warranted hereon, all such modifications as reasonably and properly come within the scope of our contribution to the art.

We claim:

1. A light distributor connected to an incoming light guide and several outgoing light guides for distributing light arriving from the incoming light guide into the outgoing light guides, comprising a disk member having an electrically controllable index of refraction and parallel surfaces and of a material having properties of a low light absorption and low light scattering, said disk member having edge portions forming an abutting surface for each of the incoming and the outgoing light guides, said abutting surface for the incoming light guide being opposite the abutting surfaces for the outgoing light guides, a total width L for the abutting surfaces for the outgoing light guides being determined by the distance between the abutting surfaces of the incoming and outgoing light guides and by the unhampered spread of the light of the incoming light guide in said disk member perpendicular to the direction of propagation of the light in the disk and parallel to the parallel surface; and individual triggerable electrodes being disposed on said disk member adjacent the abutting surfaces for the outgoing light guides to electrically control the index of refraction of the material adjacent the abutting surface for each outgoing light guide.

2. A light distributor according to claim 1, wherein the material of the disk member has an index of refraction of a value of 2.

3. A light distributor according to claim 1, wherein the material is a birefringent material.

4. A light distributor according to claim 1, wherein the distributor disk has a circular shape, and the abutting surfaces for the outgoing light guides forms a segment of a circle.

5. A light distributor according to claim 3, wherein the disk comprises a liquid crystal cell containing a liquid crystal layer.

6. A light distributor according to claim 1, wherein the distributor is connected to unsheathed light guides and the disk member has a thickness equal to the diameter of the light guides.

7. A light distributor according to claim 1, wherein the light distributor is connected to sheathed light guides, the disk member has a thickness equal to the core diameter of the sheathed light guides, and the disk member and sheathed light guides are supported on a substrate with the disk member being disposed on an intermediate layer, whose thickness is equal to the thickness of the cladding of the sheathed light guides.

* * * * *